Oct. 29, 1968    W. H. KLEIN    3,407,933
METHOD AND DEVICE FOR GRAVITY SEPARATION OF PARTICLES
Filed Sept. 26, 1966
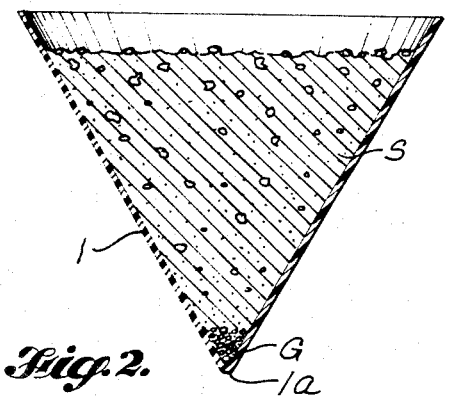
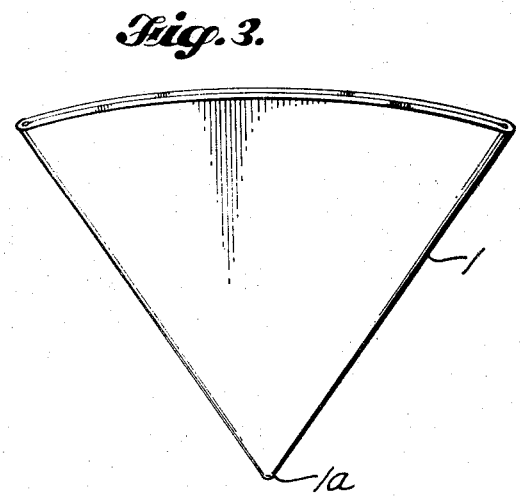
INVENTOR.
WILLIAM H. KLEIN
BY
ATTORNEYS

United States Patent Office
3,407,933
Patented Oct. 29, 1968

3,407,933
METHOD AND DEVICE FOR GRAVITY
SEPARATION OF PARTICLES
William H. Klein, Rte. 3, Box 3176,
Bainbridge Island, Wash. 98110
Filed Sept. 26, 1966, Ser. No. 581,972
6 Claims. (Cl. 209—447)

ABSTRACT OF THE DISCLOSURE

A method for separating gold or other relatively heavy particles from a mixture thereof with lighter particles, such as sand or gravel, comprising the use of a container having opposite wall portions which can be repeatedly moved relatively so as to subject the material therein to intermittent compression. Also a gravity separation device for use in accordance with the method comprising a container having downwardly convergent walls made of supple material so that a mixture held in the container may be kneaded, as by rolling the container back and forth under pressure between the user's hands, thereby agitating and working the material contained therein until the dense, heavy-metal particles work their way to the bottom or apex of the cone while the lighter materials are worked upwardly therein. The walls of the container are flexible enough, preferably, to be foldable for storage of the device, yet resilient to return to the cone shape, and strong enough to maintain their shape to hold a mixture therein.

---

The present invention concerns the separation or extraction of gold from sand or gravel or of other relatively heavy particles from a mixture with lighter particles. While primarily intended as a substitute for the time honored technique of hand panning, the invention in a broader sense introduces a novel principle in the separation of dense particles from those which are less dense. Therefore, it will be appreciated that certain modifications and changes in respect to the preferred embodiment and specific applications of the invention as herein illustratively described may be employed without departing from the essential features thereof.

An object of this invention is to provide a placer mining techniques which can be performed manually or, if desired, in larger versions on a mechanical basis.

Another object is to provide a density-related particle separation technique which operates with high efficiency using water and which can also be practiced with the mixture of particles to be separated in a dry state. Thus the invention may be employed not only in areas where water is plentiful, but also in dry areas. Since the efficiency of the separation technique is greater using water than with the mixture in the dry state, the dry-land prospector may elect to use packed-in water. The invention makes this feasible because much of the water used can readily be recovered for reuse.

The invention is also directed to provide a novel manual prospecting technique which is easier to learn and practice successfully than the conventional panning method. Thus, a child or amateur adult may learn to use the invention quickly.

Still another object is to provide an implement for "panning" gold and other precious metal particles which is smaller, lighter in weight, less expensive, and more compactly storable than a conventional gold pan and, in fact, which can be flattened or folded into such a compact form as to carry easily in the pocket of a garment or in a pack. Virtual indestructibility and long useful life of the implement include further objects of the invention.

As herein disclosed, the invention provides a technique for separating gold or other heavy particles from lighter materials, such as sand or gravel, comprising the use of a container having opposite wall portions which can be repeatedly moved relatively so as to subject the material to intermittent compression. Preferably the container is of conical shape and the walls thereof are of supple, more or less resilient material so that the same may be kneaded as by rolling the container back and forth under pressure between the user's hands, thereby to agitate and work the material contained therein. By continuing to work the materials within the container for a period of time, it is found that the dense, heavy-metal particles work their way to the bottom or apex of the cone where they remain, whereas the lighter materials are worked upwardly therein and may be removed so as to be replenished by a fresh mixture and the process repeated one or more times until a sufficient quantity of precious metal particles have accumulated in the bottom of the container. The conical shape of the container is ideally suited to manual operation owing to the uniformity of rolling contact of the container walls with the user's hands and the avoidance of any need for the container wall to bend appreciably along the elements of the cone. Water placed in the container so as to thoroughly saturate or flood the materials therein greatly expedites the settling of heavy-metal particles to the bottom, but since the container is preferably imperforate and closed at the bottom and since it is not necessary to repeatedly swash the contents, as in the ordinary panning technique, the water can be partially recovered and reused repeatedly with fresh batches of material. Alternatively, the material being worked can be in the dry state. Such an implement is conveniently made of relatively thin-wall plastic material such as polyvinyl chloride or the like, which is resilient and can be folded compactly and stored in the pocket of the user's garment, yet returns naturally to its original shape after flexure. Larger versions of the invention may be employed in which mechanized working of the materials is possible.

These and other features, objects and advantages of the invention will become more fully evident from the following description by reference to the accompanying drawings.

FIGURE 1 is a perspective view of a simple and highly useful form of the device, showing it being used according to the method.

FIGURE 2 is an axial vertical sectional view of the device, filled and with gold particles concentrated therein.

FIGURE 3 is an elevational view of the device folded, for transportation.

In panning for gold a large shallow pan has long been used. Gold-bearing gravel is placed in the gold pan, with a goodly supply of water, and the pan is held in the hands and rotated, to give the water and gravel a centrifugal sloshing motion. This requires a fair degree of skill, to permit the lighter granules to slosh over the rim of the pan, with a certain amount of water, while the heavier gold particles gather in the lower part of the pan. Besides requiring skill, the operation must use and lose appreciable quantities of water. Concentration by the use of sluice boxes and riffles requires even greater quantities of water, and the equipment is large and heavy, and is not easily transported from one location to another.

The only equipment required in operating by the present method is a cupped receptacle that is made of supple material, and preferably one of a size that can be folded flat and carried in the prospector's pocket or pack. Most efficient as a form for the container is a hollow cone. As shown conical container 1 is of rubber, flexible plastic or other supple material which can be flexed and worked without fatigue or appreciable abrasive wear by rubbing of the contents against its inside wall. The container wall thickness is not critical, but it should be sufficiently thick that it will not be limp to the extent that its walls will tend to remain generally upright when held in the user's hand to be loaded with material and while being worked. For example, with polyvinyl-chloride a wall thickness of between 1/64" and 1/32" is representative. At a thickness in this range the wall has adequate stiffness yet is sufficiently supple to be folded and flexed readily in use. The container should be imperforate and impervious to moisture, and should be closed at its apex, so that it will contain water. Typically an implement for hand working will be approximately ten inches and usually no less than seven inches in height (i.e., somewhat higher, measured along its sides, than the breadth of the user's hands), and have a cone angle of approximately 60° although this angle may vary in the range approximately between 45° and 90° and the device will still be effective.

In carrying out the method the container 1 is partially filled with sand or gravel S containing gold particles G to a level somewhat below its lip. The method operates best if the material is inundated with water, but can operate, though more slowly, if it is in a dry condition. Now the receptacle is engaged between the prospector's hands, and is repeatedly kneaded by rolling it back and forth under compression between the hands, as is indicated by the arrows in FIGURE 1. The repetition rate of the rolling action can be varied to suit the conditions, primarily the comfort of the user in exerting a sustained effort. This repeated working of the material in the container causes the heavier particles to sink by gravity and to collect within the bottom or apex 1a, FIGURE 2. When the material is flooded with water, most of the gold particles will be settled to the bottom in a minute or two of working in the described manner. Dry material usually requires a longer working period. The material should be either fully saturated or flooded, or it should be almost totally dry. Damp materials do not separate readily. The ability to carry out the method in the absence of water makes it valuable in desert areas. However, as previously mentioned, if water is used, not withstanding the supply is scarce, most of the water can be conserved and reused. Occasional removal of the larger pebbles working to the top makes the loaded container easier to work and thereby tends to speed up the action.

When the kneading has proceeded to the point that the heavy-metal particles G have collected in the container bottom, the apex 1a may be pinched off and closed between the fingers, whereupon the container may be emptied of water, sand and gravel without losing the metal particles in the bottom. These may thus be retained, combined with particles from succeeding operations, and when enough have accumulated they may also be removed.

As will be evident the novel container 1 can be flattened, as in FIGURE 3, and can be further folded, if desired, and transported conveniently in the prospector's pocket or pack.

The same principles can be employed in mechanized versions if one desires to operate on a larger scale.

I claim as my invention:

1. A hand manipulated gravity separation device for use in separating heavy metal particles from relatively lighter particles, said device comprising a generally conical cup-like open container several inches in height of liquid-impervious flexible abrasion-resistant plastic-like material, the container bottom comprising the apex portion of the cone, and the general cone angle of the container being within the range between substantially 45° and 90°, the container wall having sufficient stiffness to hold an open set when positioned upright for reception of particle materials deposited in the container, flexibility to permit distortive flattening when rolled and kneaded between the user's hands so as to work the materials therein, and supple limpness to collapse into flat-folded condition of the container when lying free on its side empty for compact storage.

2. A method of concentrating particles of a heavy material from a mixture of the same with lighter particles using a receptacle having a downwardly convergent configuration and supple side walls, which method comprises placing such mixture within the receptacle, and kneading the filled receptacle by applying compressive force to the side walls thereof and repeatedly shifting the location of application of such force back and forth along the wall so as to work the materials therein.

3. The method defined in claim 2, in which the mixture is liquid saturated.

4. The method defined in claim 2, wherein the mixture is dry.

5. The method defined in claim 2, wherin the receptacle is rolled back and forth while compressed manually.

6. A method of concentrating particles of a heavy material, such as gold dust, from a mixture of the same with a lighter material, such as sand or gravel, which method comprises placing such mixture within a supple cone, and rolling the cone and its contents back and forth repeatedly while applying compressive force at opposite sides of the cone.

References Cited

UNITED STATES PATENTS

| | | | |
|---|---|---|---|
| 2,315,150 | 4/1943 | Amberg | 229—1 |
| 3,192,889 | 7/1965 | Crudgington | 91—1.5 X |

HARRY B. THORNTON, *Primary Examiner.*

TIM R. MILES, *Assistant Examiner.*